United States Patent
Chang

(10) Patent No.: US 6,195,254 B1
(45) Date of Patent: Feb. 27, 2001

(54) CONNECTING STRUCTURE FOR THE SIGNAL LINES OF THE LIQUID CRYSTAL DISPLAY SCREEN OF A NOTEBOOK COMPUTER

(75) Inventor: Shou-Lun Chang, Taipei (TW)

(73) Assignee: First International Computer, Inc., Taipei (TW)

( * ) Notice: Subject to any disclaimer, the term of this patent is extended or adjusted under 35 U.S.C. 154(b) by 0 days.

(21) Appl. No.: 09/342,193

(22) Filed: Jun. 29, 1999

(51) Int. Cl.[7] .................. G02F 1/1333; G02F 1/3335; H04K 5/00
(52) U.S. Cl. .............. 361/681; 361/682; 361/683; 345/905; 248/917
(58) Field of Search .................. 361/683, 681, 361/680, 682; 16/221, 222–252, 342, 337, 303, 319, 332, 336; 345/905; 248/917; 40/530

(56) References Cited

U.S. PATENT DOCUMENTS

| | | | |
|---|---|---|---|
| 5,103,377 | * 4/1992 | Kobayashi et al. | 361/394 |
| 5,115,374 | * 5/1992 | Hongoh | 361/393 |
| 5,144,290 | * 9/1992 | Honda et al. | 340/711 |
| 5,233,502 | * 8/1993 | Beatty et al. | 361/729 |
| 5,237,488 | * 8/1993 | Moser et al. | 361/729 |
| 5,283,862 | * 2/1994 | Lund | 395/155 |
| 5,355,279 | * 10/1994 | Lee et al. | 361/681 |
| 5,498,165 | * 3/1996 | Tseng | 439/31 |
| 5,724,704 | * 3/1998 | Seo | 16/254 |
| 5,751,544 | * 5/1998 | Song | 361/681 |
| 5,805,415 | * 9/1998 | Tran et al. | 361/681 |

FOREIGN PATENT DOCUMENTS 5-150861 * 6/1993 (JP) .................. G06F/1/16

* cited by examiner

Primary Examiner—Gregory Thompson
Assistant Examiner—Anatoly Vortman
(74) Attorney, Agent, or Firm—Rosenberg, Klein & Lee

(57) ABSTRACT

Disclosed is a connecting structure for the signal lines of the liquid crystal display screen of a notebook computer installed between the primary machine of a notebook computer and a liquid crystal display screen, and comprising a casing, a first connector, and a second connector. The casing is connected to the liquid crystal display screen at one end thereof, while another end has an inserting portion for being inserted into the primary machine. A first connector is installed within the inserting portion of the casing. The first connector is connected to the signal lines of the liquid crystal display screen; A second connector is installed on the mother board of the primary machine. The second connector may be connected to the first connector. Thereby, the present invention can be used to connect the single lines of the liquid crystal screen and the primary machine. The assembly and detachment of the signal lines of the liquid crystal display screen and the mother board are easy, rapid, effective, and time and cost saving. Furthermore, it may be maintained conveniently. Beside, since the signal lines can be detached easily, the combination of the liquid crystal display screen and the mother board are flexible. The updatig of liquid crystal display screens of different specifications is not confined. Therefore, it can be changed according to the requirement of customers.

4 Claims, 5 Drawing Sheets

CONNECTING STRUCTURE FOR THE SIGNAL LINES OF THE LIQUID CRYSTAL DISPLAY SCREEN OF A NOTEBOOK COMPUTER

BACKGROUND OF THE INVENTION

1. Field of the Invention

The present invention relates to a connecting structure for the signal lines of the liquid crystal display screen of a notebook computer, and especially to a connecting structure for connecting the signal lines of the liquid crystal display screen to a mother board, thus the structure can be easily assembled, detached and maintained.

2. Description of the Prior Art

The liquid crystal display screen of a prior art notebook computer have to be installed with signal lines to be connected to a mother board, thus, the signals of a computer may be transferred to a liquid crystal display screen.

However, the prior art signal lines of the liquid crystal display screen are welded to the mother board, this is inconvenient in assembly and detaching and is time-consuming. Therefore, maintenance is difficult. Moreover, a general liquid crystal display screen has various specifications. Since the signal lines thereof are not easily detached, the updating of the liquid crystal display screen is strictly confined so that his prior art design can not meet the requirement of the customers.

SUMMARY OF THE INVENTION

Accordingly, the object of the present invention is to provide a connecting structure for the signal line of the liquid crystal display screen of a notebook computer comprising a casing, a first connector, and a second connector. The casing is connected to the liquid crystal display screen at one end thereof, while another end has an inserting portion for being inserted into the primary machine. A first connector is installed within the inserting portion of the casing: The first connector is connected to the signal lines of the liquid crystal display screen; A second connector is installed on the mother board of the primary machine. The second connector may be connected to the first connector. Thereby, the assembly and detaching of the signal lines of the liquid crystal display screen and the mother board are performed by the connecting of the first connector and the second connector, and thus, is easy, rapid, effective, and time and cost saving. Furthermore, it may be maintained conveniently.

Another object of the present invention is to provide a connecting structure for the signal lines of the liquid crystal display screen of a notebook computer, wherein by the connecting of the first connector and the second connector, the signal lines of the liquid crystal display screen and the mother board are connected. Thus, the combination of the liquid crystal display screen and the mother board are flexible. The updating of the liquid crystal display screens with different specifications are not confined so as to be changed according to the requirement of customers.

The present invention will be better understood and its numerous objects and advantages will become apparent to those skilled in the art by referencing to the following drawings in which:

DETAILED DESCRIPTION OF THE PREFERRED EMBODIMENT

Figure 1:
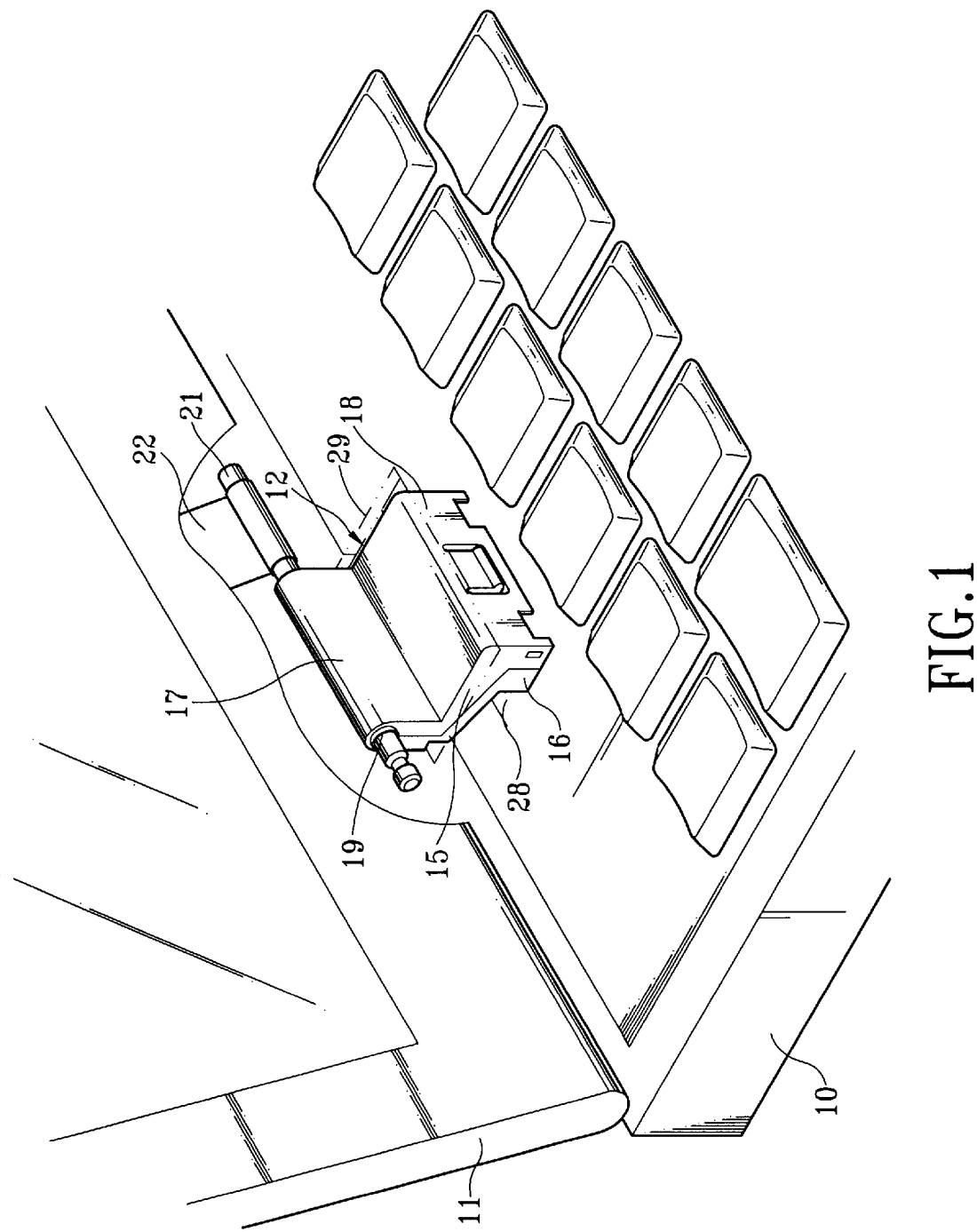
FIG. 1 is a schematic view showing the connection of the present invention.
Figure 2:
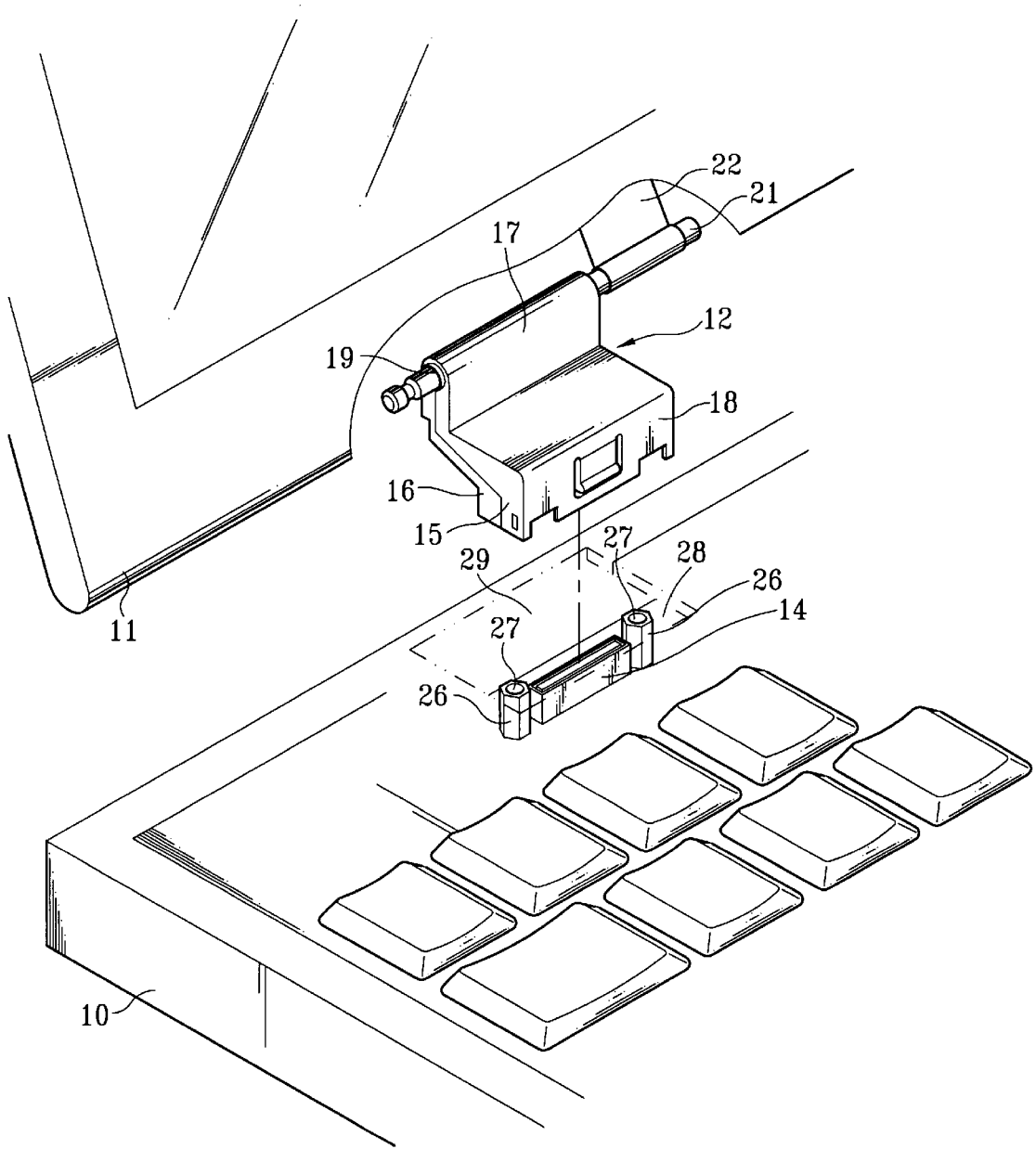
FIG. 2 is a schematic view showing the separating state of the present invention.
Figure 3:
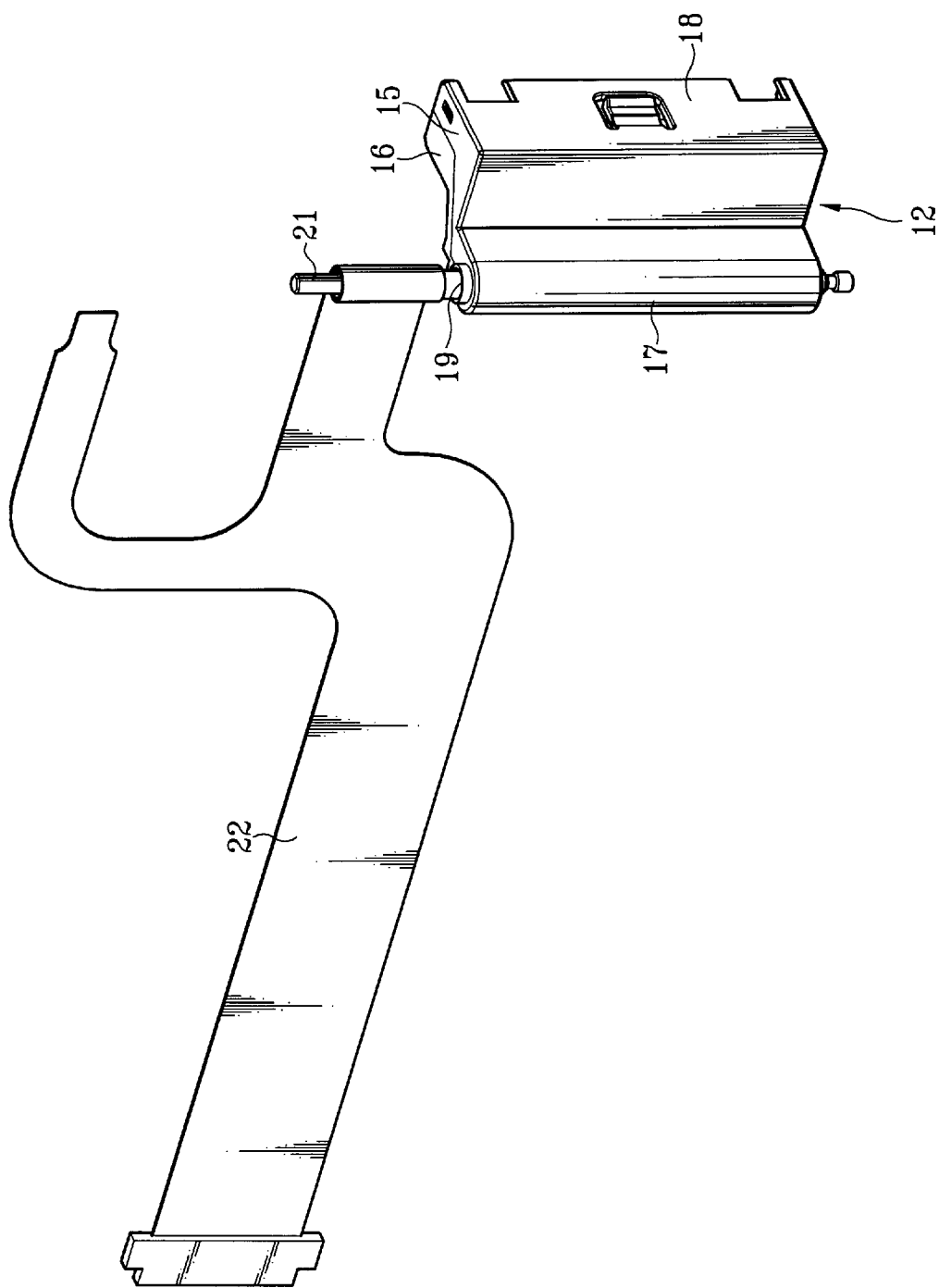
FIG. 3 is a perspective view of the present invention.
Figure 4:
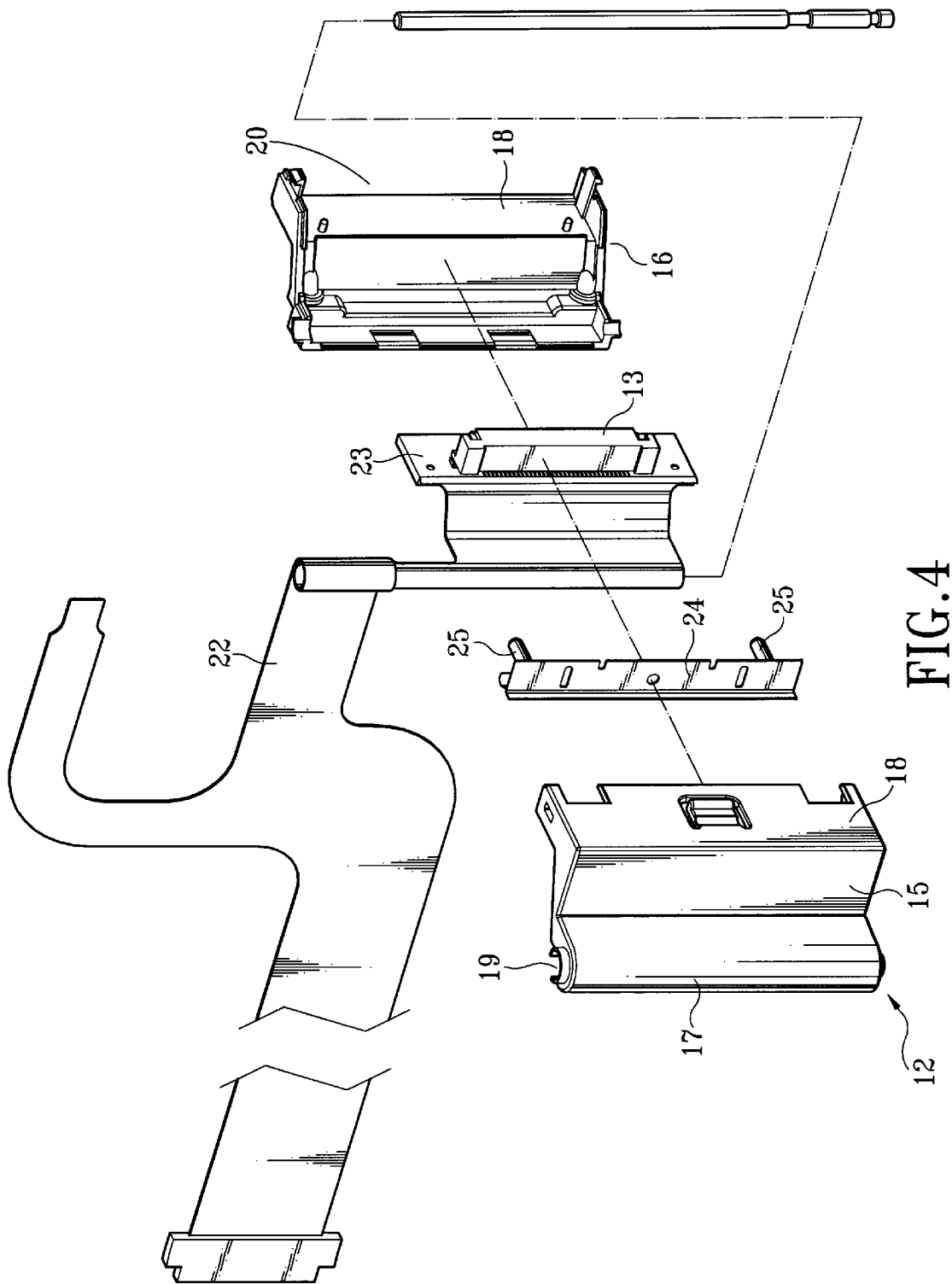
FIG. 4 is an exploded perspective view of the present invention.
Figure 5:
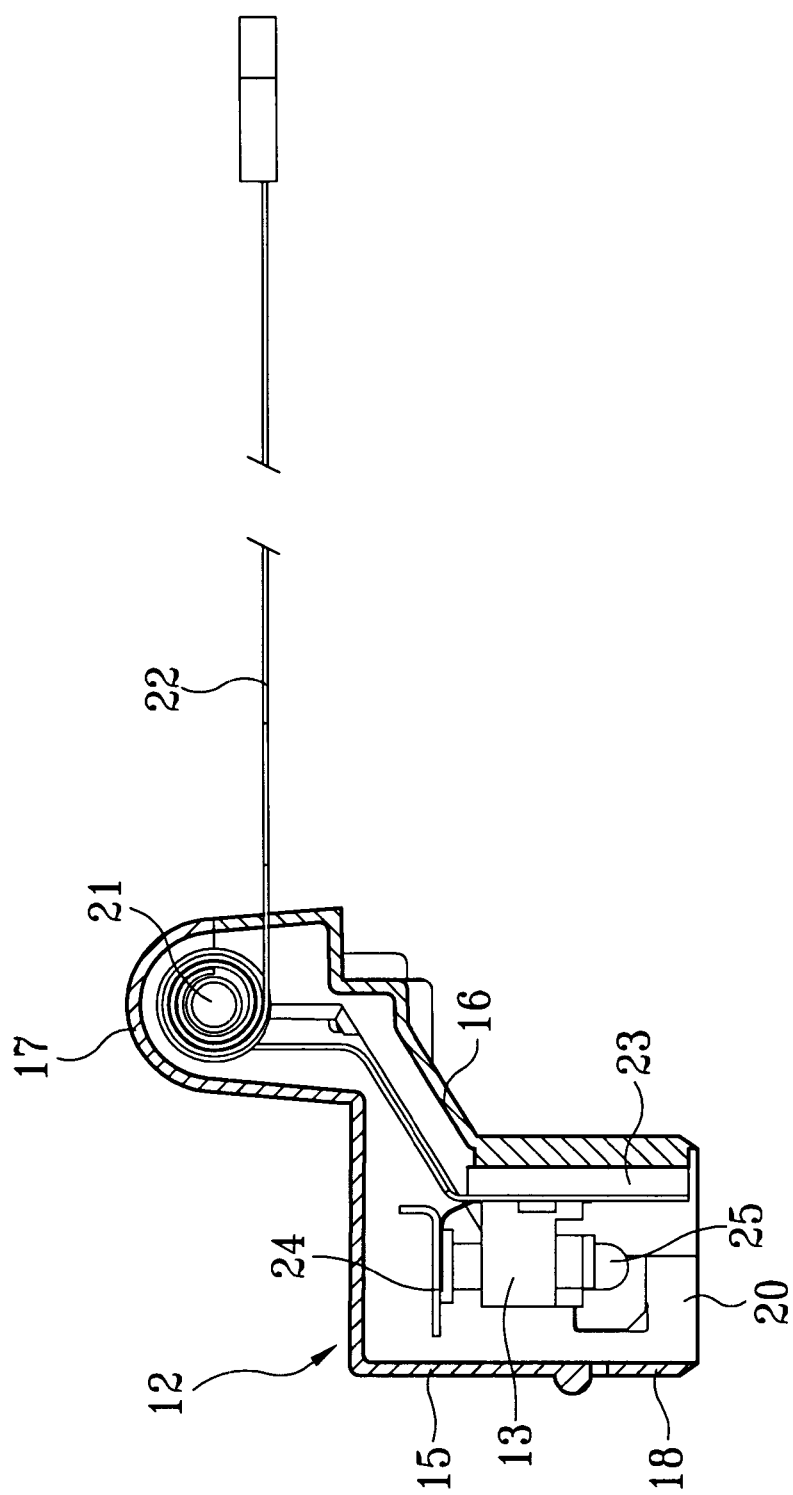
FIG. 5 is a cross sectional view of the present invention.

With reference to FIGS. 1~5, a connecting structure for the signal lines of the liquid crystal display screen of a notebook computer according to the present invention is illustrated. The connecting structure is installed between a primary machine 10 of a notebook computer and a liquid crystal display screen 11 and includes a casing 12, a first connector 13 and a second connector 14. The casing 12 is formed by a first housing 15 and a second housing 16. The fist housing 15 and the second housing 16 can be combined through buckling, adhesion, or screwedly locking. The casing 12 is a hollow casing and has a pivotal portion 17 and an inserting portion 18. Two sides of the pivotal portion 17 are installed with through holes 19, respectively. One end of the inserting portion 18 is formed with an opening 20. The pivotal portion 17 of the casing 12 is passed through by a pivotal shaft 21. Two ends of the pivotal shaft 21 protrudes out from the through holes 19 and then is properly connected to the liquid crystal display screen 11. Therefore, the casing 12 is connected to the lower end of liquid crystal display screen 11 through the pivotal portion 17.

The first connector 13 is properly connected to signal lines 22 of the liquid crystal display screen 11, wherein ends of the signal lines (bank lines) of the liquid crystal display screen 11 are inserted into the through holes 19 from one side of the casing 12. One end of the each signal line 22 is connected to a substrate 23 so as to be fixed therein. The substrate 23 is fixed within the casing 12 and the first connector 13 is fixed to the substrate 23 so that the first connector 13 is fixed within the inserting portion 18 of the casing 12. The signal lines 22 are electrically connected to the fist connector 13. Moreover, a metal plate 24 is firmly secured to the casing 12. Two guide posts 25 protrude from the two sides of the first connector 13. The two guide posts 25 are placed at two sides of the first connector 13.

The second connector 14 is arranged on the mother board 28 within the primary machine 10. Two sides of the second connector 14 are installed with two guide seats 26 with a corresponding relation to the two guide posts 25. Each guide seat 26 is formed with a guide hole 27 for being inserted by the guide post 25. A via hole 29 is formed at the top of the primary machine 10 with a position correspondent to that of the second connector 14. The via hole 29 can be inserted by the inserting portion 18 of the casing 12 so that the first connector 13 within the inserting portion 18 of the casing 12 may pass through the via hole 29 to be connected to the second connector 14.

In the present invention, the inserting portion 18 of the casing 12 can be inserted into the via hole 29 at the top of the primary machine 10. The first connector 13 connected with the signal lines 22 of the liquid crystal display screen 11 may be inserted to the second connector 14 of the mother board 28 so that the two connectors 13 and 14 are electrically connected with one another. When the two connectors 13 and 14 are inserted to one another, the guide posts 25 at two sides of the first connector 13 may be inserted to the guide holes 27 of the guide seats 26 at two sides of the second connector 14. By matching the two guide posts 25 and guide seats 26, the connectors 13 and 14 are guided so as to be combined successfully. Moreover, the combination of the guide post 25 and guide seat 26 has an effect of grounding, therefore, electromagnetic interference is reduced.

In the present invention, by the combination of the first connector 13 and the second connector 14, the connection of the signal lines 22 of the liquid crystal display screen 11 and the mother board 28 within a primary machine 10 are performed successfully, thus, the displaying signals within a computer are therefore transferred to the liquid crystal display screen 11. Since the signal lines 22 of the liquid crystal display screen 11 are connected to the mother board 28 by inserting, the assembly and detachment thereof are ease, rapid, effective, and time and cost saving Furthermore, it may be maintained conveniently. Beside, since the signal lines 22 can be detached easily, the combination of the liquid crystal display screen 11 and the mother board 10 are flexible. The updating of liquid crystal display screens 11 of different specifications is not confined. Therefore, it can be changed according to the requirement of customers.

Accordingly, by the present invention, the connecting structure for the signal lines of the liquid crystal display screen of a notebook computer in the prior art is improved, and the defect in the prior art, such as inconvenience in assembly, detachment and maintenance, has also been improved by the present invention.

Although the present invention has been described using specified embodiment, the examples are meant to be illustrative and not restrictive. It is clear that many other variations would be possible without departing from the basic approach, demonstrated in the present invention.

What is claimed is:

1. A connecting structure for operably coupling a liquid crystal display screen having a plurality of signal lines extending therefrom to a mother board of a portable computer comprising:

(a) a casing having first and second ends, said first end being coupled to the liquid crystal display screen, said second end including an inserting portion inserted into the portable computer, said casing including a substrate affixed thereto connected to at least one of the signal lines of the liquid crystal display screen;

(b) a first connector disposed within said inserting portion of said casing affixed to said substrate, said first connector being connected to at least one of the signal lines of the liquid crystal display screen; and, (c) a second connector coupled to the mother board of the portable computer for engaging said first connector.

2. The connecting structure as recited in claim 1 wherein said casing further includes a metal plate affixed thereto, said metal plate having at least a pair of guide posts protruding therefrom, said guide posts being disposed adjacent opposing sides of said first connector.

3. The connecting structure as recited in claim 2 wherein said second connector includes at least a pair of guide seats formed thereon, said guide seats each defining a guide hole for receiving one said guide post.

4. The connecting structure as recited in claim 1 wherein said inserting portion of said casing passes through a via hole formed in a housing of the portable computer.

* * * * *